US012148347B2

(12) United States Patent
He

(10) Patent No.: US 12,148,347 B2
(45) Date of Patent: Nov. 19, 2024

(54) DRIVING METHOD OF DISPLAY PANEL, DISPLAY PANEL, AND DISPLAY DEVICE

(71) Applicant: SHENZHEN CHINA STAR OPTOELECTRONICS SEMICONDUCTOR DISPLAY TECHNOLOGY CO., LTD., Guangdong (CN)

(72) Inventor: Jhenwei He, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/432,015

(22) PCT Filed: May 19, 2021

(86) PCT No.: PCT/CN2021/094484
§ 371 (c)(1),
(2) Date: Aug. 18, 2021

(87) PCT Pub. No.: WO2022/236854
PCT Pub. Date: Nov. 17, 2022

(65) Prior Publication Data

US 2024/0021134 A1 Jan. 18, 2024

(30) Foreign Application Priority Data

May 10, 2021 (CN) ......................... 202110506474.3

(51) Int. Cl.
*G09G 3/20* (2006.01)
*G09G 3/36* (2006.01)

(52) U.S. Cl.
CPC ......... *G09G 3/2074* (2013.01); *G09G 3/3607* (2013.01); *G09G 2300/0819* (2013.01);
(Continued)

(58) Field of Classification Search
CPC ............... G09G 3/2074; G09G 3/3607; G09G 2300/0819; G09G 2320/0247; G09G 2320/0626; G09G 2320/0673
See application file for complete search history.

(56) References Cited

U.S. PATENT DOCUMENTS

2008/0297524 A1* 12/2008 Huang ................. G09G 3/3648 345/530
2018/0315383 A1* 11/2018 Shimoshikiryoh .. G09G 3/3614
(Continued)

FOREIGN PATENT DOCUMENTS

CN 1521711 A 8/2004
CN 102629453 A 8/2012
(Continued)

*Primary Examiner* — Kenneth B Lee, Jr.
(74) *Attorney, Agent, or Firm* — PV IP PC; Wei Te Chung

(57) ABSTRACT

A driving method of a display panel, a display panel, and a liquid crystal display device are provided. The display panel includes sub-pixels in N areas. Gray level states of each of the sub-pixels include a high gray level and a low gray level. The gray level states of the sub-pixels in the same area remain for N consecutive frames, and the gray level states of the sub-pixels in one of the N areas in the same frame are switched. As such, a brightness change range between adjacent frames can be decreased, and a brightness change frequency can be increased, thereby reducing or avoiding flicker phenomenon.

19 Claims, 6 Drawing Sheets

(52) U.S. Cl.
CPC ............... *G09G 2320/0247* (2013.01); *G09G 2320/0626* (2013.01); *G09G 2320/0673* (2013.01)

(56) References Cited

U.S. PATENT DOCUMENTS

| | | | | |
|---|---|---|---|---|
| 2020/0175930 | A1* | 6/2020 | Koo | G09G 3/3406 |
| 2020/0202803 | A1* | 6/2020 | Lin | G09G 3/3648 |
| 2020/0372869 | A1* | 11/2020 | Yang | G09G 3/3688 |
| 2021/0035512 | A1* | 2/2021 | Yin | G09G 3/3607 |
| 2021/0295782 | A1* | 9/2021 | Bae | G09G 3/3688 |
| 2022/0398964 | A1* | 12/2022 | Zhang | G09G 3/20 |

FOREIGN PATENT DOCUMENTS

| | | | |
|---|---|---|---|
| CN | 111564134 | A | 8/2020 |
| CN | 112037729 | A | 12/2020 |
| CN | 112530344 | A | 3/2021 |

* cited by examiner

DRIVING METHOD OF DISPLAY PANEL, DISPLAY PANEL, AND DISPLAY DEVICE

TECHNICAL FIELD

The present disclosure relates to the display technology field, and more particularly to a driving method of a display panel, a display panel, and a display device.

BACKGROUND ART

A display panel which adopts time-domain viewing angle compensation algorithms can effectively improve or remove the graininess of a displayed image. When liquid crystals in the display panel react slowly, the time-domain viewing angle compensation algorithms cannot achieve the ideal large-scale state switching for each frame. When a number of remaining frames at a gray level state is increased in a scene in which a refresh rate of the display panel is low, flicker phenomenon occurs obviously.

For example, as shown in FIG. 1, in one frame of the display panel, gray level states of all sub-pixels are at a high gray level H. In a next frame of the display panel, the gray level states of all sub-pixels are at a low gray level L. Alternatively, in one frame of the display panel, the gray level states of all sub-pixels are at the low gray level L. In a next frame of the display panel, the gray level states of all sub-pixels are at the high gray level H. In this the gray level state switching of each frame, due to the long response time of the liquid crystals, it is not easy to determine that each frame is at the high gray level H or at the low gray level L. As such, effect of improving large viewing angle color shift is weak or the large viewing angle color shift cannot be improved.

For another example, as shown in FIG. 2, in one of the time-domain viewing angle compensation algorithms, gray level states of all sub-pixels are always switched every two consecutive frames for one time. Specifically, the gray level states of all the sub-pixels in two consecutive frames are at the high gray level H, and the gray level states of all sub-pixels in two consecutive frames next to the two consecutive frames are at the low gray level L. Alternatively, the gray level states of all the sub-pixels in two consecutive frames are at the low gray level L, and the gray level states of all sub-pixels in two consecutive frames next to the two consecutive frames are at the high gray level H. In this situation, the number of remaining frames at a gray level state is increased. Since the gray level states of all sub-pixels are switched every two consecutive frames for one time, a brightness change frequency between frames is reduced. As such, flicker phenomenon occurs obviously.

For yet another example, as shown in FIG. 3 and FIG. 4, in another of the time-domain viewing angle compensation algorithms, in a first frame F1, gray level states of a part of sub-pixels are at a high gray level H, and gray-level states of the other part of the sub-pixels are at a low gray level L. In a second frame F2, the gray level states of the part of the sub-pixels are still at the high gray level H, and the gray level states of the other part of the sub-pixels are still at the low gray level L. In a third frame F3, the gray level states of the part of the sub-pixels are at the low gray level L, and the gray level states of the other part of the sub-pixels are at the high gray level H. In a fourth frame F4, the gray level states of the part of the sub-pixels are still at the low gray level L, and the gray level states of the other part of the sub-pixels are still at the high gray level H. Compared with the above-mentioned two time-domain viewing angle compensation algorithms, a spatial distribution of the gray level states is added in the present time-domain viewing angle compensation algorithm. That is, in the same frame, the gray level states of the part of the sub-pixels are at the low gray level L, and the gray level states of the other part of the sub-pixels are at the high gray level H.

In the time-domain viewing angle compensation algorithm shown in FIG. 3 or FIG. 4, the gray level state of the same sub-pixel is also maintained for two consecutive frames. In the present time-domain viewing angle compensation algorithm, the flicker phenomenon does not occur at a high refresh rate, for example, 100 Hz or more. However, when the refresh rate is low, for example, below 100 Hz, the flicker phenomenon which is visible to the naked eye still exists.

In a brightness change curve 51 shown in FIG. 5, one reason that the flicker phenomenon exists at a low refresh rate is that the gray level states of all sub-pixels are switched every two frames. Correspondingly, brightness is changed every two frames. When a refresh frequency of the display panel is F, a brightness change frequency corresponds to 2F. This reduces the brightness change frequency.

It should be noted that the above-mentioned introduction of the background art is only to facilitate a clear and complete understanding of the technical solutions of the present disclosure. Accordingly, it cannot be considered that the above-mentioned technical solutions are known to those skilled in the art just because it appears in the background art of the present disclosure.

Technical Problem

An objective of the present disclosure is to provide a driving method of a display panel, a display panel, and a display device for easing the technical problem that the flicker phenomenon easily occurs in display panel at a low refresh frequency.

Technical Solution

In a first aspect, a driving method of a display panel provide by the present disclosure includes: initializing gray level states of sub-pixels of the display panel, wherein the gray level states include a high gray level and a low gray level; dividing the sub-pixels of the display panel into N areas, wherein N is a positive integer greater than or equal to 2; and driving the gray level states of the sub-pixels in the same area to remain for N consecutive frames, and switching the gray level states of the sub-pixels in one of the N areas in the same frame.

In some embodiments, the step of dividing the sub-pixels of the display panel into the N areas includes: configuring at least one pair of sub-pixels to a corresponding one of the areas; and configuring a gray level state of one of the at least one pair of sub-pixels to be the high gray level, and configuring a gray level state of the other of the at least one pair of sub-pixels to be the low gray level.

In some embodiments, the step of dividing the sub-pixels of the display panel into the N areas includes: configuring at least one pair of sub-pixels to a corresponding one of the areas; and configuring the same number of the at least one pair of sub-pixels into different areas.

In some embodiments, the step of driving the gray level states of the sub-pixels in the same area to remain for the N consecutive frames, and switching the gray level states of the sub-pixels in the one of the N areas in the same frame includes: determining a refresh frequency of the display panel; determining time of one frame of the display panel based on the refresh frequency; and determining, based on the time of one the frame which is a brightness change interval of the display panel, a brightness change frequency of the display panel to be a reciprocal of the time of the one frame.

In some embodiments, the step of driving the gray level states of the sub-pixels in the same area to remain for the N consecutive frames, and switching the gray level states of the sub-pixels in the one of the N areas in the same frame further includes: determining, based on a brightness change range and a brightness change frequency of the display panel, a flicker standard which can be perceived; and determining, based on the flicker standard, that the refresh frequency is greater than or equal to 48 Hz.

In some embodiments, the step of initializing the gray level states of the sub-pixels of the display panel includes: initializing the gray level states of the sub-pixels to a corresponding high gray level or a corresponding low gray level; configuring a point value in a gamma curve with a first correction coefficient of less than 2.2 to be the corresponding high gray level; and configuring a point value in the gamma curve with a second correction coefficient of greater than or equal to 2.2 to be the corresponding low gray level.

In some embodiments, the step of initializing the gray level states of the sub-pixels of the display panel further includes: configuring an average value of the first correction coefficient and the second correction coefficient to be 2.2.

In some embodiments, the driving method further includes: configuring N to be equal to 2, wherein the N areas include a first area and a second area; and driving gray level states of sub-pixels in the first area to remain for two consecutive frames, and switching gray level states of sub-pixels in the second area and then remaining for two frames, wherein the switching the gray level states includes switching from the high gray level to the low gray level or switching from the low gray level to the high gray level.

In a second aspect, a display panel provided by the present disclosure includes: an initializing module, configured to initialize gray level states of sub-pixels of the display panel, wherein the gray level states include a high gray level and a low gray level; a dividing module, configured to divide the sub-pixels of the display panel into N areas, where N is a positive integer greater than or equal to 2; and a driving module, configured to drive the gray level states in the same area to remain for N consecutive frames, and configured to switch the gray level states of the sub-pixels in one of the N areas in the same frame.

In a third aspect, a liquid crystal display device provided by the present disclosure includes the display panel of any one of the above-mentioned embodiments.

Advantageous Effects

In the driving method of the display panel, the display panel, and the liquid crystal display device provided by the present embodiment, the display panel is divided into the N areas, the gray level states of the sub-pixels in the same area remain for N consecutive frames, and the gray level states of the sub-pixels in one of the N areas in the same frame are switched. As such, a brightness change range between adjacent frames can be decreased, and a brightness change frequency can be increased, thereby reducing or avoiding flicker phenomenon.

DETAILED DESCRIPTION OF EMBODIMENTS

Figure 1:
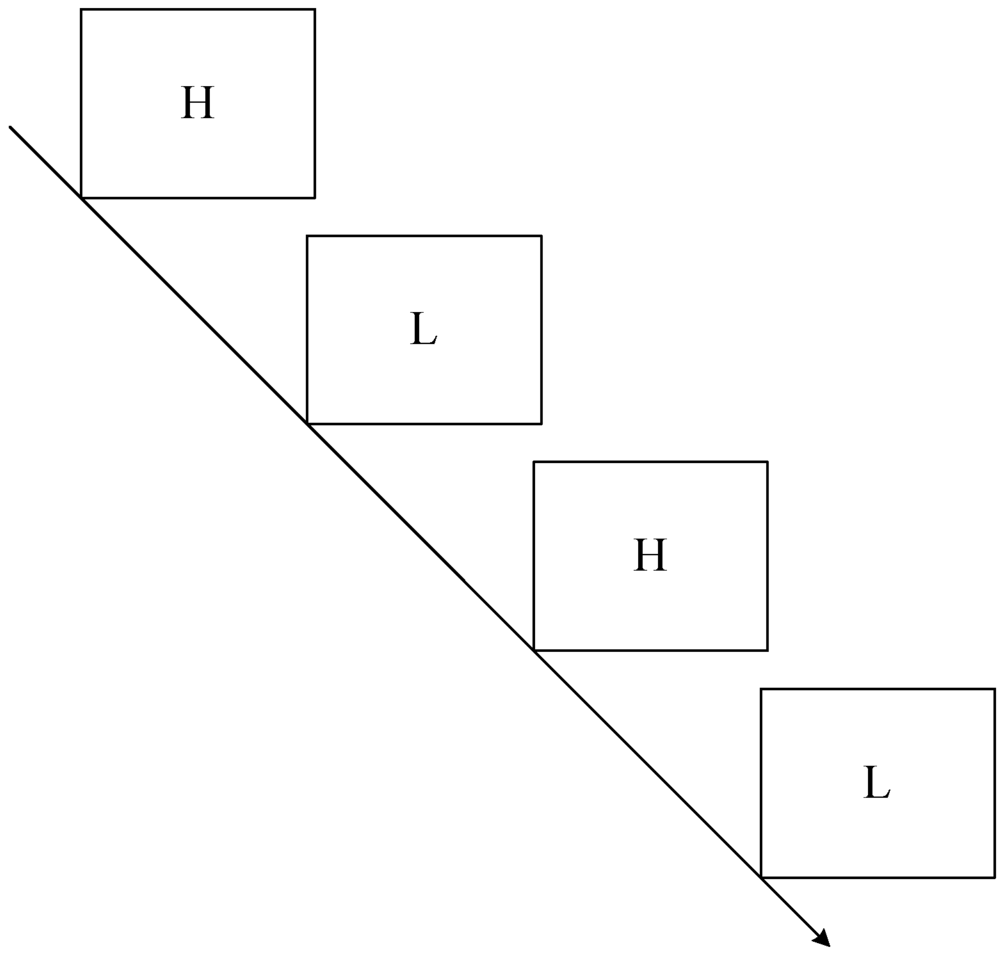
FIG. 1 (PRIOR ART)
FIG. 1 illustrates a first structural diagram of a display panel provided by a conventional technical scheme.
Figure 2:
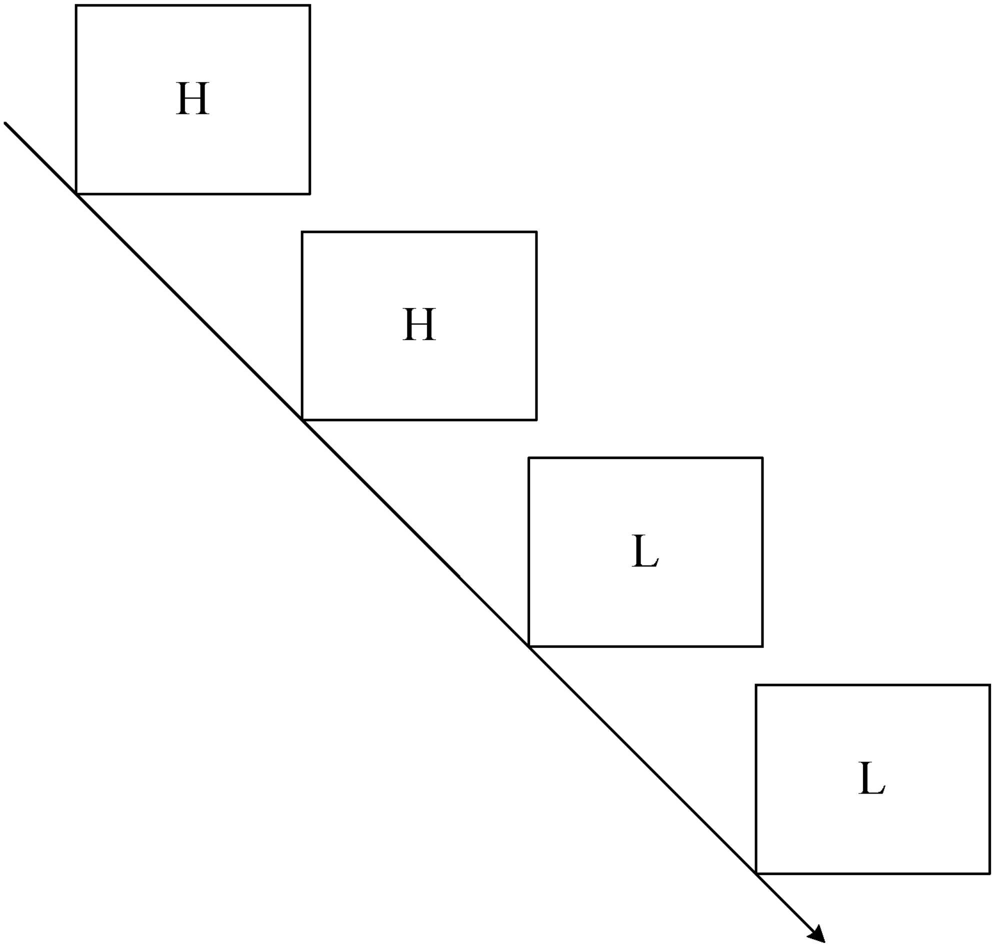
FIG. 2 (PRIOR ART)
FIG. 2 illustrates a second structural diagram of a display panel provided by a conventional technical scheme.
Figure 3:
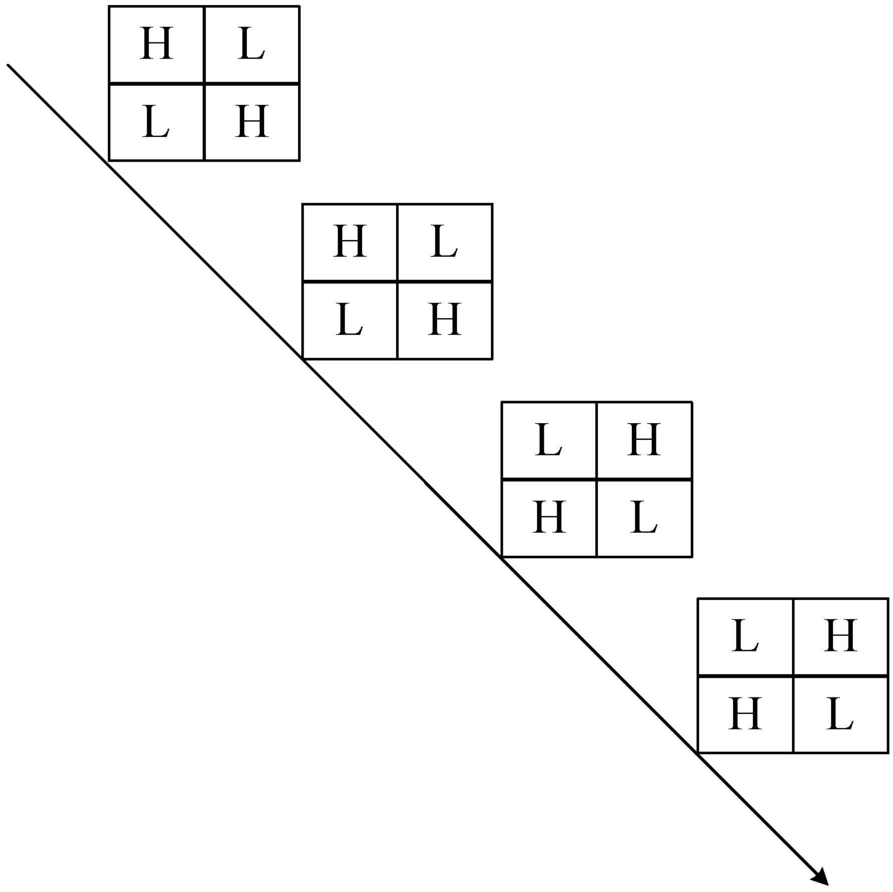
FIG. 3 (PRIOR ART)
FIG. 3 illustrates a third structural diagram of a display panel provided by a conventional technical scheme.
Figure 4:
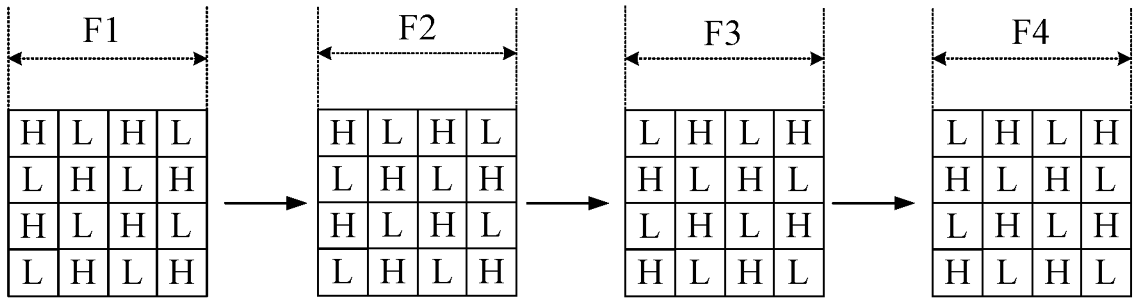
FIG. 4 (PRIOR ART)
FIG. 4 illustrates a fourth structural diagram of a display panel provided by a conventional technical scheme.
Figure 5:
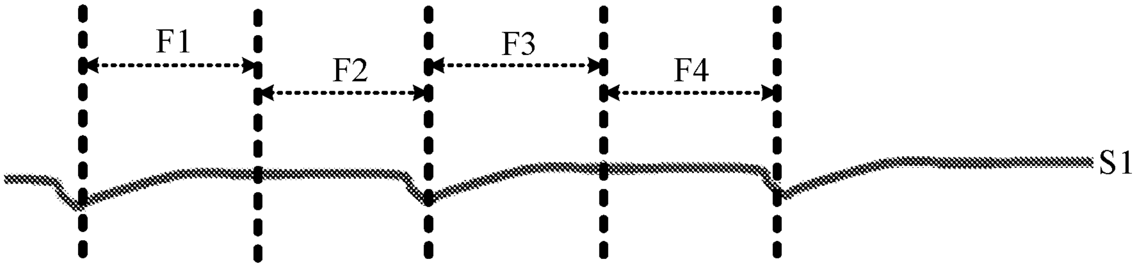
FIG. 5 (PRIOR ART)
FIG. 5 illustrates a brightness change curve of the display panel in FIG. 3 or FIG. 4.

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure but are not intended to limit the present disclosure.

Please refer to FIG. 6 to FIG. 10. One embodiment of the present disclosure provides a display panel. The display panel includes sub-pixels in N areas. Gray level states of each of the sub-pixels include a high gray level H and a low gray level L. The gray level states of the sub-pixels in the same area remain for N consecutive frames, and the gray level states of the sub-pixels in one of the N areas in the same frame are switched, where N is a positive integer greater than or equal to 2.

It can be understood that in the display panel provided by the present embodiment, the display panel is divided into the N areas, the gray level states of the sub-pixels in the same area remain for N consecutive frames, and the gray level states of the sub-pixels in one of the N areas in the same frame are switched. As such, a brightness change range between adjacent frames can be decreased, and a brightness change frequency can be increased, thereby reducing or avoiding flicker phenomenon.

It should be noted that in the present embodiment, the high gray level H can be defined as a first correction coefficient of less than 2.2 corresponding to a gamma curve, and the low gray level L can be defined as a second correction coefficient of greater than or equal to 2.2 corresponding to the gamma curve.

In one embodiment, an average value of the first correction coefficient and the second correction coefficient is 2.2.

It can be understood that the average value of the first correction coefficient and the second correction coefficient can be obtained by dividing a sum of the first correction coefficient and the second correction coefficient by 2.

In one embodiment, one area can include a pair of or a plurality of pairs of sub-pixels. Each pair of sub-pixels can include two of the sub-pixels. The gray level state of one of the pair of sub-pixels is at the high gray level H, and the gray level state of the other one of the pair of sub-pixels is at the low gray level L.

It can be understood that in the present embodiment, at a time point or in a period of time, a number of sub-pixels at the low gray level L is equal to a number of sub-pixels with the high gray level H in the same area. As such, the brightness change range can be further decreased, and it is beneficial for further reducing or eliminating the flicker phenomenon at a low display frequency.

In one embodiment, a number of sub-pixels in one of the areas is equal to a number of sub-pixels in another one of the areas.

It can be understood that different areas having the same number of sub-pixels can further decrease the brightness change range. This is beneficial for further reducing or eliminating the flicker phenomenon at a low display frequency.

In one embodiment, a refresh frequency of the display panel is equal to a brightness change frequency of the display panel.

It should be noted that in the embodiment provided by the present disclosure, the gray level states of the sub-pixels in one of the areas are converted every frame. Therefore, the brightness of the display panel is changed once every frame. In other words, the brightness of the display panel is changed once after one frame of time. Accordingly, the brightness change frequency is a reciprocal of one frame of time. A reciprocal of the refresh frequency of the display panel is one frame of time. Therefore, the refresh frequency of the display panel is equal to the brightness change frequency of the display panel. In other words, in the embodiment provided by the present disclosure, the brightness change frequency of the display panel can be determined by the refresh frequency of the display panel.

In one embodiment, the refresh frequency of the display panel is greater than or equal to 48 Hz.

It should be noted that, generally speaking, when the gray levels states are switched, the human eye can easily perceive the flicker in a situation where the brightness change range is large. For example, the brightness change range is large in a situation wherein the gray level states of all sub-pixels are switched. In this situation, the refresh frequency of the display panel is less than or equal to 50 Hz. Accordingly, in the embodiment provided by the present disclosure, the gray level states of the sub-pixels in only one of the areas in the same frame are switched, and thus the brightness change range corresponding to each gray level state switching is small. It is not easy for human eye to perceive the flicker even at a lower refresh frequency. Based on this, it can be understood that the flicker is not easily generated even when the refresh frequency of the display panel is as low as 48 Hz.

One embodiment of the present disclosure provides a display panel. The display panel includes sub-pixels in N areas. Gray levels states of each of the sub-pixels include a high gray level H and a low gray level L. The gray level states of the sub-pixels in the same area are switched every other N consecutive frames, and the gray level states of the sub-pixels in the N areas are completely converted after (N-1) frames, where N is a positive integer greater than or equal to 2.

It can be understood that in the display panel provided by the present embodiment, the display panel is divided into the N areas, the gray level states of the sub-pixels in the same area are switched every other N consecutive frames, and the gray level states of the sub-pixels in the N areas are completely converted after the (N-1) frames. As such, a brightness change range between adjacent frames can be decreased, and a brightness change frequency can be increased, thereby reducing or avoiding flicker phenomenon.

It should be noted that switching the gray levels states of the sub-pixels in the same partition every other N consecutive frames can represent that the gray levels states of the sub-pixels in the same area remain for N consecutive frames. Similarly, the completion of converting the gray level states of the sub-pixels in the N areas after the N-1 frame can also represent that switching the gray levels states of the sub-pixels in one of the areas in the same frame.

Figure 6:
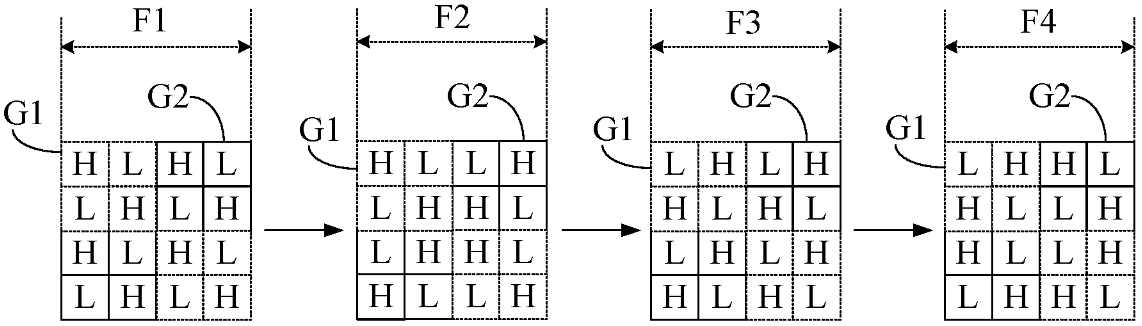
FIG. 6 illustrates a structural diagram of display panel provided by one embodiment of the present disclosure.
Figure 7:
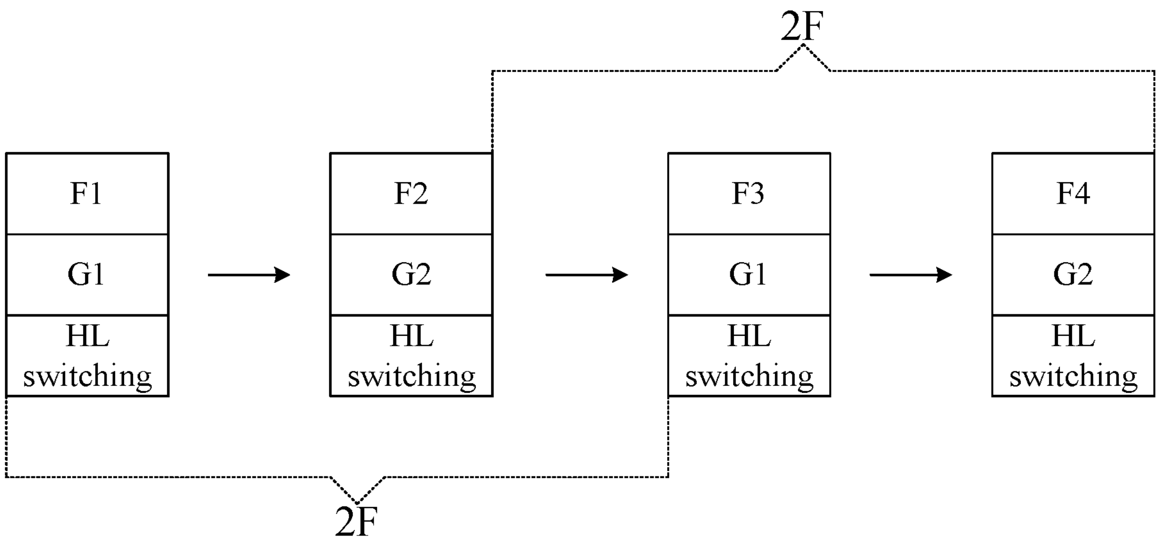
FIG. 7 illustrates a structural diagram of display panel provided by another embodiment of the present disclosure

Based on the above-mentioned descriptions, as shown in FIGS. 6 and 7, in one embodiment, when N is equal to 2, a display area of the display panel can be divided into a first area G1 and a second area G2. The first area G1 includes areas enclosed by dashed lines, and the second area G2 includes areas enclosed by the solid lines. The display panel can include a first row of sub-pixels, a second row of sub-pixels, a third row of sub-pixels, and a fourth row of sub-pixels which are sequentially arranged from top to bottom, and include a first column of sub-pixels, a second column of sub-pixels, a third column of sub-pixels, and a fourth column of sub-pixels which are sequentially arranged from left to right.

The first area G1 can include a sub-pixel in the first row and the first column, a sub-pixel in the first row and the second column, a sub-pixel in the second row and the first column, a sub-pixel in the second row and the second column, a sub-pixel in the third row and the third column, a sub-pixel in the third row and the fourth column, a sub-pixel in the fourth row and the third column, and a sub-pixel in the fourth row and the fourth column. The second area G2 can include a sub-pixel in the first row and the third column, a sub-pixel in the first row and the fourth column, a sub-pixel in the second row and the third column, a sub-pixel in the second row and the fourth column, a sub-pixel in the third row and the first column, a sub-pixel in the third row and the second column, a sub-pixel in the fourth row and the first column, and a sub-pixel in the fourth row and the second column.

In the first frame F1 and in the first area G1, the gray level state of the sub-pixel in the first row and the first column is at the high gray level H, the gray level state of the sub-pixel in the first row and the second column is at the low gray level L, the gray level state of the sub-pixel in the second row and the first column is at the low gray level L, the gray level state of the sub-pixel in the second row and the second column is at the high gray level H, the gray level state of the sub-pixel in the third row and the third column is at the high gray level H, the gray level state of the sub-pixel in the third row and the fourth column is at the low gray level L, the gray level state of the sub-pixel in the fourth row and the third column is at the low gray level L, and the gray level state of the sub-pixel in the fourth row and the fourth column is at the high gray level H. In the first frame F1 and in the second area G2, the gray level state of the sub-pixel in the first row and the third column is at the high gray level H, the gray level state of the sub-pixel in the first row and the fourth column is at the low gray level L, the gray level state of the sub-pixel in the second row and the third column is at the low gray level L, the gray level state of the sub-pixel in the second row and the fourth column is at the high gray level H, the gray level state of the sub-pixel in the third row and the first column is at the high gray level H, the gray level state of the sub-pixel in the third row and the second column is at the low gray level L, the gray level state of the sub-pixel in the fourth row and the first column is at the low gray level L, and the gray level state of the sub-pixel in the fourth row and the second column is at the high gray level H.

In the second frame F2, the gray level state of each of the sub-pixels in the first area G1 remains unchanged. However, in the second area G2, the gray level state of the sub-pixel in the first row and the third column is switched to the low gray level L, the gray level state of the sub-pixel in the first row and the fourth column is switched to the high gray level H, the gray level state of the sub-pixel in the second row and the third column is switched to the high gray level H, the gray level state of the sub-pixel in the second row and the fourth column is switched to the low gray level L, the gray level state of the sub-pixel in the third row and the first column is switched to the low gray level L, the gray level state of the sub-pixel in the third row and the second column is switched to the high gray level H, the gray level state of the sub-pixel in the fourth row and the first column is switched to the high gray level H, and the gray level state of the sub-pixel in the fourth row and the second column is switched to the low gray level L.

In the third frame F3 and in the first partition area G1, the gray level state of the sub-pixel in the first row and the first column is switched to the low gray level L, the gray level state of the sub-pixel in the first row and the second column is switched to the high gray level H, the gray level state of the sub-pixel in the second row and the first column is switched to the high gray level H, the gray level state of the sub-pixel in the second row and the second column is switched to the low gray level L, the gray level state of the sub-pixel in the third row and the third column is switched to the low gray level L, the gray level state of the sub-pixel in the third row and the fourth column is switched to the high gray level H, the gray level state of the sub-pixel in the fourth row and the third column is switched to the high gray level H, and the gray level state of the sub-pixel in the fourth row and the fourth column is switched to the low gray level L. However, the gray level state of each of the sub-pixels in the second area G1 remains unchanged.

In the fourth frame F4, the gray level state of each of the sub-pixels in the first area G1 remains unchanged. However, in the second area G2, the gray level state of the sub-pixel in the first row and the third column is switched to the high gray level H, the gray level state of the sub-pixel in the first row and the fourth column is switched to the low gray level L, the gray level state of the sub-pixel in the second row and the third column is switched to the low gray level L, the gray level state of the sub-pixel in the second row and the fourth column is switched to the high gray level H, the gray level state of the sub-pixel in the third row and the first column is switched to the high gray level H, the gray level state of the sub-pixel in the third row and the second column is switched to the low gray level L, the gray level state of the sub-pixel in the fourth row and the first column is switched to the low gray level L, and the gray level state of the sub-pixel in the fourth row and the second column is switched to the high gray level H.

As shown in FIG. 7, in the first frame F1, the gray level state of each of the sub-pixels in the first area G1 can be switched to an initial state by the corresponding switching of the high gray level H and the low gray level L (that is, the HL switching). In the second frame F2, the gray level state of each of the sub-pixels in the first area G1 remains in the initial state corresponding to the first frame F1. In the third frame F3, the gray level state of each of the sub-pixels in the first area G1 is switched to a converted state. In the fourth frame F4, the gray level state of each of the sub-pixels in the first area G1 remains in the converted state corresponding to the third frame F3. When the gray level state of each of the sub-pixels in the initial state is at the high gray level H, the gray level state of each of the sub-pixels in the converted state is at the low gray level L. Alternatively, when the gray level state of each of the sub-pixels in the initial state is at the low gray level L, the gray level state of each of the sub-pixels in the converted state is at the high gray level H.

It can be understood that in the first frame F1 and the second frame F2, the gray level state of each of the sub-pixels in the first area G1 is in the initial state, and in the third frame F3 and the fourth frame F4, the gray level state of each of the sub-pixels in the first area G1 is in the converted state. The gray level state of each of the sub-pixels in the first area G1 is switched once every other frame.

Correspondingly, the gray level state of each of the sub-pixels in the first area G1 is changed once every other frame. Accordingly, a brightness change of the gray level state of each of the sub-pixels in the first area G1 is performed once every two frames.

In the first frame F1, the gray level state of each of the sub-pixels in the second area G2 is in an initial state. In the second frame F2, the gray level state of each of the sub-pixels in the second area G2 is in a converted state. In the third frame F3, the gray level state of each of the sub-pixels in the second area G2 remains in the converted state. In the fourth frame F4, the gray level state of each of the sub-pixels in the second area G2 is switched to the initial state. Similarly, the gray level state of each of the sub-pixels in the second area G2 is switched once every other frame. Correspondingly, the gray level state of each of the sub-pixels in the second area G2 is changed once every other frame. Accordingly, a brightness change of the gray level state of each of the sub-pixels in the second area G2 is performed once every two frames.

Based on the above-mentioned descriptions, it is assumed that the refresh frequency of the display panel is F. The time of each frame is 1/F. The time of two frames is 2/F. As such, the brightness change frequency of each of the sub-pixels in the first area G1 can be defined as 2F. Similarly, the brightness change frequency of each of the sub-pixels in the second area G2 is 2F, where 2F can represent as twice the refresh frequency F.

Figure 8:
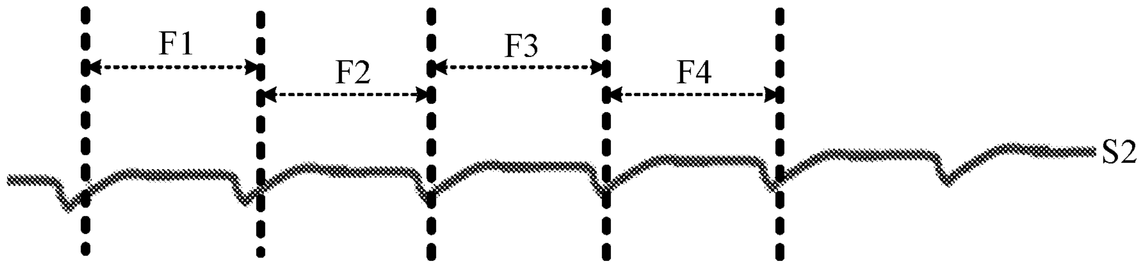
FIG. 8 illustrates a brightness change curve of the display panel in FIG. 6 or FIG. 7.

FIG. 8 illustrates a brightness change curve S2 of the display panel as shown in FIG. 6 or FIG. 7. Since the sub-pixels in only one of the first area G1 or the second area G2 in the same frame are switched, the brightness of the display panel is correspondingly changed every frame. For example, the brightness corresponding to the first frame F1, the brightness corresponding to the second frame F2, the brightness corresponding to the third frame F3, and the brightness corresponding to the fourth frame F4 can be different from each other. Therefore, when the refresh frequency of the display panel is assumed to be F, the time of one frame is a reciprocal of the refresh frequency. Correspondingly, the brightness of the display panel is changed every frame, and thus the brightness change frequency of the display panel can be defined as F.

Accordingly, the brightness change frequency in the brightness change curve S2 is increased obviously when compared with the brightness change frequency in the brightness change curve 51. Accordingly, it is beneficial for further reducing or eliminating the flicker phenomenon at a low display frequency.

Similarly, it can be known that N can also be equal to 4. Correspondingly, the display area of the display panel can be divided into a first area, a second area, a third area, and a fourth area. The display panel can include a first row of sub-pixels, a second row of sub-pixels, a third row of sub-pixels, and a fourth row of sub-pixels which are sequentially arranged from top to bottom, and include a first column row of sub-pixels, a second column of sub-pixels, a third column of sub-pixels, and a fourth column of sub-pixels which are sequentially arranged from left to right.

The first area can include a sub-pixel in the first row and the first column, a sub-pixel in the first row and the second column, a sub-pixel in the second row and the first column, and a sub-pixel in the second row and the second column.

The second area can include a sub-pixel in the first row and the third column, a sub-pixel in the first row and the fourth column, a sub-pixel in the second row and the third column, and a sub-pixel in the second row and the fourth column.

The third area can include a sub-pixel in the third row and the first column, a sub-pixel in the third row and the second column, a sub-pixel in the fourth row and the first column, and a sub-pixel in the fourth row and the second column.

The fourth area can include a sub-pixel in the third row and the third column, a sub-pixel in the third row and the fourth column, a sub-pixel in the fourth row and the third column, and a sub-pixel in the fourth row and the fourth column.

In the first frame, the gray level states of the sub-pixels in the first area remain unchanged, the gray level states of the sub-pixels in the second area remain unchanged, the gray level state of the sub-pixels in the third area remain unchanged, and the gray level states of the sub-pixels in the fourth partition are switched.

In the second frame, the gray level states of the sub-pixels in the first area remain unchanged, the gray level states of the sub-pixels in the second area remain unchanged, the gray level state of the sub-pixels in the third area are switched, and the gray level states of the sub-pixels in the fourth partition remain unchanged.

In the third frame, the gray level states of the sub-pixels in the first area remain unchanged, the gray level states of the sub-pixels in the second area are switched, the gray level state of the sub-pixels in the third area remain unchanged, and the gray level states of the sub-pixels in the fourth partition remain unchanged.

In the fourth frame, the gray level states of the sub-pixels in the first area are switched, the gray level states of the sub-pixels in the second area remain unchanged, the gray level state of the sub-pixels in the third area remain unchanged, and the gray level states of the sub-pixels in the fourth partition remain unchanged.

In the fifth frame, the gray level states of the sub-pixels in the first area remain unchanged, the gray level states of the sub-pixels in the second area remain unchanged, the gray level state of the sub-pixels in the third area remain unchanged, and the gray level states of the sub-pixels in the fourth partition are switched.

The rest can be deduced by analogy. The gray level states of the sub-pixels in the same area are switched every other four consecutive frames, and the gray level states of the sub-pixels in the four areas are converted completely after 3 frames. That is, the gray level states of the sub-pixels in each of the areas are switched once, and the gray lever states of the sub-pixels in only one of the areas in the same frame are switched.

In one of the embodiments, N can also be equal to any one of 3, 5, 6, 8, 9, and 10.

Figure 9:
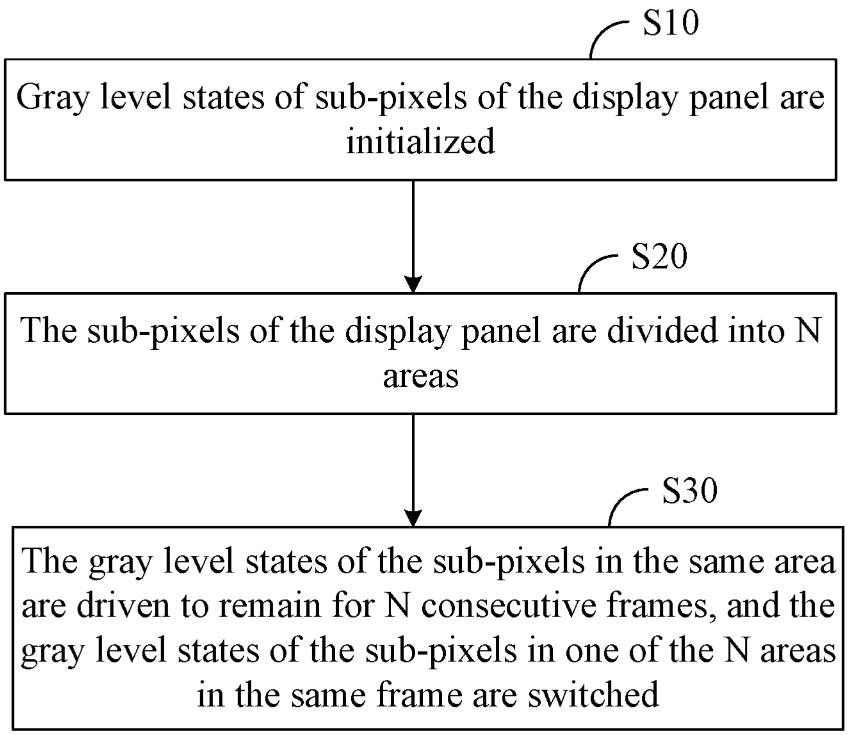
FIG. 9 illustrates a flowchart of a driving method of a display panel provided by one embodiment of the present disclosure.

As shown in FIG. 9, one embodiment of the present disclosure provides a driving method of a display panel including the following steps.

In step S10, gray level states of sub-pixels of the display panel are initialized, and the gray level states include a high gray level and a low gray level.

In step S20, the sub-pixels of the display panel are divided into N areas, where N is a positive integer greater than or equal to 2.

In step S30, the gray level states of the sub-pixels in the same area are driven to remain for N consecutive frames, and the gray level states of the sub-pixels in one of the N areas in the same frame are switched.

It understood that in the driving method of the display panel provided by the present embodiment, the display panel is divided into the N areas, the gray level states of the sub-pixels in the same area remain for N consecutive frames, and the gray level states of the sub-pixels in one of the N areas in the same frame are switched. As such, a brightness change range between adjacent frames can be decreased, and a brightness change frequency can be increased, thereby reducing or avoiding flicker phenomenon.

In one embodiment, the step of dividing the sub-pixels of the display panel into the N areas includes: configuring at least one pair of sub-pixels to a corresponding one of the areas; and configuring a gray level state of one of the at least one pair of sub-pixels to be the high gray level, and configuring a gray level state of the other of the at least one pair of sub-pixels to be the low gray level.

In one embodiment, the step of dividing the sub-pixels of the display panel into the N areas includes: configuring at least one pair of sub-pixels to a corresponding one of the areas; and configuring the same number of the at least one pair of sub-pixels into different areas.

In one embodiment, the step of driving the gray level states of the sub-pixels in the same area to remain for the N consecutive frames, and switching the gray level states of the sub-pixels in the one of the N areas in the same frame includes: determining a refresh frequency of the display panel; determining time of one frame of the display panel based on the refresh frequency; and determining, based on the time of one the frame which is a brightness change interval of the display panel, a brightness change frequency of the display panel to be a reciprocal of the time of the one frame.

In one embodiment, the step of driving the gray level states of the sub-pixels in the same area to remain for the N consecutive frames, and switching the gray level states of the sub-pixels in the one of the N areas in the same frame further includes: determining, based on a brightness change range and a brightness change frequency of the display panel, a flicker standard which can be perceived; and determining, based on the flicker standard, that the refresh frequency is greater than or equal to 48 Hz.

In one embodiment, the step of initializing the gray level states of the sub-pixels of the display panel includes: initializing the gray level states of the sub-pixels to a corresponding high gray level or a corresponding low gray level; configuring a point value in a gamma curve with a first correction coefficient of less than 2.2 to be the corresponding high gray level; and configuring a point value in the gamma curve with a second correction coefficient of greater than or equal to 2.2 to be the corresponding low gray level.

In one embodiment, the step of initializing the gray level states of the sub-pixels of the display panel further includes: configuring an average value of the first correction coefficient and the second correction coefficient to be 2.2.

In one embodiment, the driving method further includes: configuring N to be equal to 2, wherein the N areas include a first area and a second area; and driving gray level states of sub-pixels in the first area to remain for two consecutive frames, and switching gray level states of sub-pixels in the second area and then remaining for two frames, wherein the switching the gray level states includes switching from the high gray level to the low gray level or switching from the low gray level to the high gray level.

Figure 10:
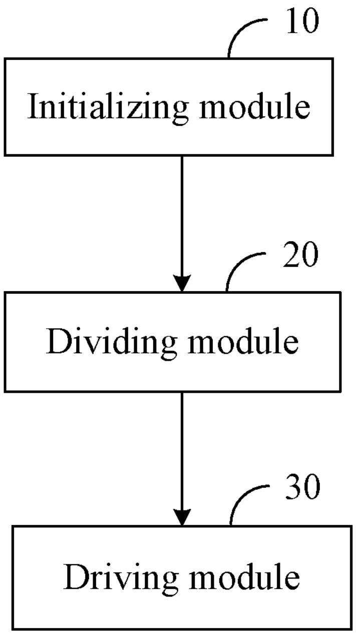
FIG. 10 illustrates a fifth structural diagram of a display panel provided by one embodiment of the present disclosure.

As shown in FIG. 10, one embodiment of the present disclosure provides a display panel including an initializing module 10, a dividing module 20, and a driving module 30. The initialization module 10 is configured to initialize gray level states of sub-pixels of the display panel. The gray level states include a high gray level and a low gray level. The dividing module 20 is configured to divide the sub-pixels of the display panel into N areas, where N is a positive integer greater than or equal to 2. The driving module 30 is configured to drive the gray level states in the same area to remain for N consecutive frames, and configured to switch the gray level states of the sub-pixels in one of the N areas in the same frame.

It can be understood that in the display panel provided by the present embodiment, the display panel is divided into the N areas, the gray level states of the sub-pixels in the same area remain for N consecutive frames, and the gray level states of the sub-pixels in one of the N areas in the same frame are switched. As such, a brightness change range between adjacent frames can be decreased, and a brightness change frequency can be increased, thereby reducing or avoiding flicker phenomenon.

In one embodiment, the initializing module 10 can be connected to the dividing module 20, and the dividing module 20 can be connected to the driving module 30.

One embodiment of the present disclosure provides a liquid crystal display device including includes the display panel in any one of the above-mentioned embodiments.

It can be understood that in the liquid crystal display device provided by the present embodiment, the display panel is divided into the N areas, the gray level states of the sub-pixels in the same area remain for N consecutive frames, and the gray level states of the sub-pixels in one of the N areas in the same frame are switched. As such, a brightness change range between adjacent frames can be decreased, and a brightness change frequency can be increased, thereby reducing or avoiding flicker phenomenon. Alternatively, the display panel is divided into the N areas, the gray level states of the sub-pixels in the same area are switched every other N consecutive frames, and the gray level states of the sub-pixels in the N areas are completely converted after the (N-1) frames. As such, a brightness change range between adjacent frames can be decreased, and a brightness change frequency can be increased, thereby reducing or avoiding flicker phenomenon.

It should be understood that those skilled in the art can make equivalent replacements or variations according to the technical solutions and inventive concepts of the present disclosure. All the variations or replacements shall fall with the scope of the appended claims.

What is claimed is:

1. A driving method of a display panel, comprising:

initializing gray level states of sub-pixels of the display panel, wherein the gray level states comprise a high gray level and a low gray level;

dividing the sub-pixels of the display panel into N areas, wherein N is a positive integer greater than or equal to 2; and driving the gray level states of the sub-pixels in the same area to remain for N consecutive frames, and switching the gray level states of the sub-pixels in one of the N areas in the same frame;

wherein the step of the gray level states of the sub-pixels of the display panel comprises:

initializing the gray level states of the sub-pixels to a corresponding high gray level or a corresponding low gray level;

configuring a point value in a gamma curve with a first correction coefficient of less than an average value to be the corresponding high gray level; and configuring a point value in the gamma curve with a second correction coefficient of greater than or equal to the average value to be the corresponding low gray level, wherein the average value of the first correction coefficient and the second correction coefficient is obtained by dividing a sum of the first correction coefficient and the second correction coefficient by 2.

2. The driving method of claim 1, wherein the step of dividing the sub-pixels of the display panel into the N areas comprises:

configuring at least one pair of sub-pixels to a corresponding one of the areas; and configuring a gray level state of one of the at least one pair of sub-pixels to be the high gray level, and configuring a gray level state of the other of the at least one pair of sub-pixels to be the low gray level.

3. The driving method of claim 1, wherein the step of dividing the sub-pixels of the display panel into the N areas comprises:

configuring at least one pair of sub-pixels to a corresponding one of the areas; and configuring the same number of the at least one pair of sub-pixels into different areas.

4. The driving method of claim 1, wherein the step of driving the gray level states of the sub-pixels in the same area to remain for the N consecutive frames, and switching the gray level states of the sub-pixels in the one of the N areas in the same frame comprises:

determining a refresh frequency of the display panel;

determining time of one frame of the display panel based on the refresh frequency; and determining, based on the time of one the frame which is a brightness change interval of the display panel, a brightness change frequency of the display panel to be a reciprocal of the time of the one frame.

5. The driving method of claim 4, wherein the step of driving the gray level states of the sub-pixels in the same area to remain for the N consecutive frames, and switching the gray level states of the sub-pixels in the one of the N areas in the same frame further comprises:

determining, based on a brightness change range and a brightness change frequency of the display panel, a flicker standard which can be perceived; and determining, based on the flicker standard, that the refresh frequency is greater than or equal to 48 Hz.

6. The driving method of claim 1, wherein the step of initializing the gray level states of the sub-pixels of the display panel further comprises:

configuring the point value in the gamma curve with the first correction coefficient of less than 2.2 to be the corresponding high gray level; and configuring the point value in the gamma curve with the second correction coefficient of greater than or equal to 2.2 to be the corresponding low gray level.

7. The driving method of claim 6, wherein the step of initializing the gray level states of the sub-pixels of the display panel further comprises:

configuring the average value of the first correction coefficient and the second correction coefficient to be 2.2.

8. The driving method of claim 1, wherein the driving method further comprises:

configuring N to be equal to 2, wherein the N areas comprise a first area and a second area; and driving gray level states of sub-pixels in the first area to remain for two consecutive frames, and switching gray level states of sub-pixels in the second area and then remaining for two frames, wherein the switching the gray level states comprises switching from the high gray level to the low gray level or switching from the low gray level to the high gray level.

9. A display panel, comprising:

an initializing module, configured to initialize gray level states of sub-pixels of the display panel, wherein the gray level states comprise a high gray level and a low gray level;

a dividing module, configured to divide the sub-pixels of the display panel into N areas, where N is a positive integer greater than or equal to 2; and a driving module, configured to drive the gray level states in the same area to remain for N consecutive frames, and configured to switch the gray level states of the sub-pixels in one of the N areas in the same frame;

wherein the gray level states of the sub-pixels are initialized to a corresponding high gray level or a corresponding low gray level;

a point value in a gamma curve with a first correction coefficient of less than an average value to be the corresponding high gray level is configured; and a point value in the gamma curve with a second correction coefficient of greater than or equal to the average value to be the corresponding low gray level is configured, wherein the average value of the first correction coefficient and the second correction coefficient is obtained by dividing a sum of the first correction coefficient and the second correction coefficient by 2.

10. The display panel of claim 9, wherein at least one pair of sub-pixels is configured to a corresponding one of the areas; and a gray level state of one of the at least one pair of sub-pixels is configured to be the high gray level, and a gray level state of the other of the at least one pair of sub-pixels is configured to be the low gray level.

11. The display panel of claim 9, wherein at least one pair of sub-pixels is configured to a corresponding one of the areas; and the same number of the at least one pair of sub-pixels is configured into different areas.

12. The display panel of claim 9, wherein a refresh frequency of the display panel is determined;

time of one frame of the display panel is determined based on the refresh frequency; and a brightness change frequency of the display panel is determined, based on the time of one the frame which is a brightness change interval of the display panel, to be a reciprocal of the time of the one frame.

13. The display panel of claim 12, wherein a flicker standard which can be perceived is determined based on a brightness change range and a brightness change frequency of the display panel; and the refresh frequency is determined to be greater than or equal to 48 Hz based on the flicker standard.

14. The display panel of claim 9, wherein the point value in the gamma curve with the first correction coefficient of less than 2.2 to be the corresponding high gray level is configured; and the point value in the gamma curve with the second correction coefficient of greater than or equal to 2.2 to be the corresponding low gray level is configured.

15. The display panel of claim 14, wherein the average value of the first correction coefficient and the second correction coefficient is configured to be 2.2.

16. The display panel of claim 9, wherein N is configured to be equal to 2, wherein the N areas comprise a first area and a second area; and gray level states of sub-pixels in the first area are driven to remain for two consecutive frames, and gray level states of sub-pixels in the second area are switched and then remaining for two frames, wherein the switching the gray level states comprises switching from the high gray level to the low gray level or switching from the low gray level to the high gray level.

17. A display device, comprising the display panel of claim 9.

18. The display device of claim 17, wherein at least one pair of sub-pixels is configured to a corresponding one of the areas; and a gray level state of one of the at least one pair of sub-pixels is configured to be the high gray level, and a gray level state of the other of the at least one pair of sub-pixels is configured to be the low gray level.

19. The display device of claim 17, wherein at least one pair of sub-pixels is configured to a corresponding one of the areas; and the same number of the at least one pair of sub-pixels is configured into different areas.

* * * * *